(12) United States Patent
Gardner et al.

(10) Patent No.: US 7,837,919 B2
(45) Date of Patent: Nov. 23, 2010

(54) SYSTEM, METHOD, APPARATUS, AND APPLICATIONS FOR OPEN CELL WOVEN STRUCTURAL SUPPORTS

(75) Inventors: Slade H. Gardner, Fort Worth, TX (US); Brian T. Rosenberger, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 822 days.

(21) Appl. No.: 11/237,181

(22) Filed: Sep. 28, 2005

(65) Prior Publication Data

US 2007/0069075 A1    Mar. 29, 2007

(51) Int. Cl.
*B29C 70/36* (2006.01)
*B64C 3/34* (2006.01)

(52) U.S. Cl. .................. 264/257; 264/313; 264/317; 264/DIG. 44; 244/123.4

(58) Field of Classification Search ............ 264/257, 264/134, 137, 313, 317, DIG. 44; 244/123.4, 244/123.14
See application file for complete search history.

(56) References Cited

U.S. PATENT DOCUMENTS

| | | | |
|---|---|---|---|
| 4,662,587 A | 5/1987 | Whitener | 244/117 |
| 4,686,250 A * | 8/1987 | Qureshi | 523/440 |
| 4,764,238 A | 8/1988 | Dastin et al. | 156/245 |
| 5,178,705 A * | 1/1993 | Kimbara et al. | 156/148 |
| 5,296,064 A * | 3/1994 | Muzzy et al. | 156/180 |
| 5,342,679 A * | 8/1994 | Aochi et al. | 428/113 |
| 5,599,612 A | 2/1997 | Muraki et al. | 442/60 |
| 5,624,622 A | 4/1997 | Boyce et al. | 264/258 |
| 6,086,814 A * | 7/2000 | Krenkel et al. | 264/610 |
| 6,638,466 B1 | 10/2003 | Abbott | 264/238 |
| 6,723,271 B2 | 4/2004 | Hemphill et al. | 264/510 |

* cited by examiner

*Primary Examiner*—Matthew J. Daniels
(74) *Attorney, Agent, or Firm*—Bracewell & Giuliani LLP

(57) ABSTRACT

An open cell or highly porous woven composite truss utilizes fibers of carbon, glass, ceramic, or the like that are woven together in a loom. The warps or tow are woven with the wefts, while the fibers are impregnated with resin. The resin impregnation step may be performed before or after the weaving step. The truss is then cured on the loom and later may be machined as needed. A rigid foam material may be used to stabilize the shape of the truss prior to curing and while machining. The foam may be later chemically dissolved or otherwise disposed of.

21 Claims, 4 Drawing Sheets

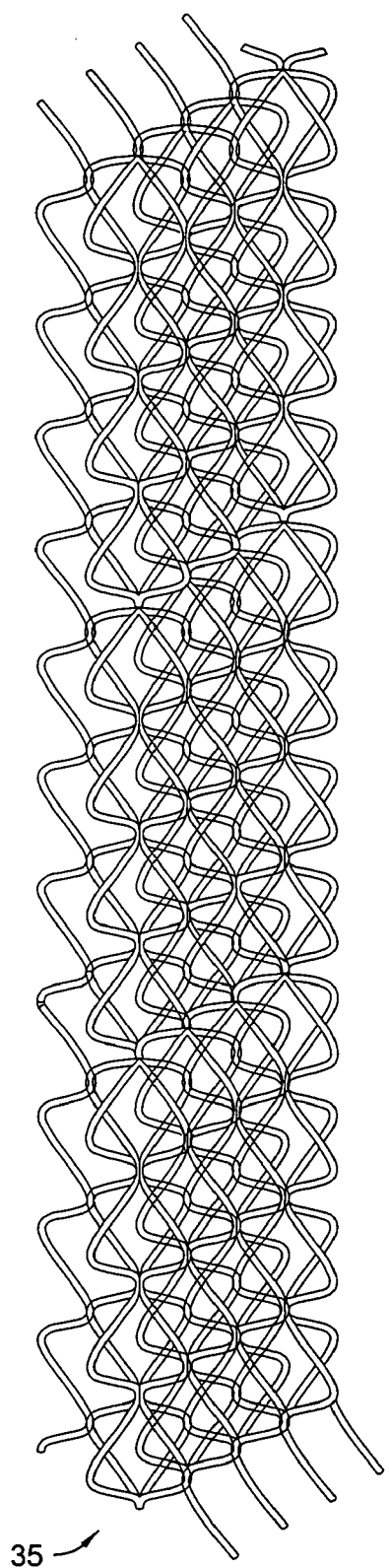
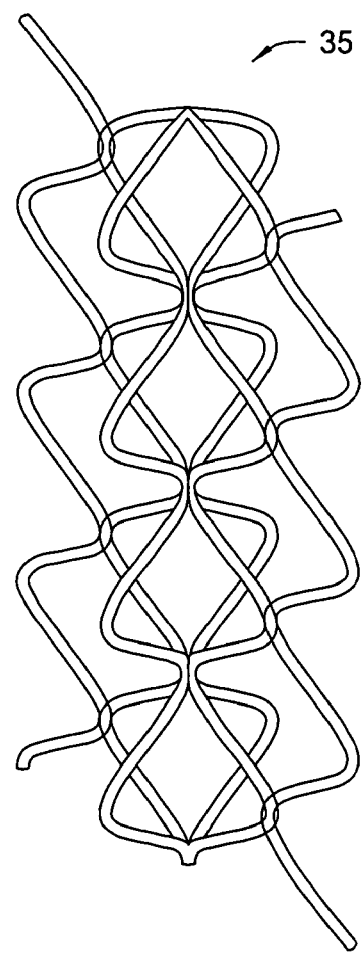
FIG. 3
FIG. 4

SYSTEM, METHOD, APPARATUS, AND APPLICATIONS FOR OPEN CELL WOVEN STRUCTURAL SUPPORTS

BACKGROUND OF THE INVENTION

1. Technical Field

The present invention relates in general to an open cell composite structure and, in particular, to an improved system, method, and apparatus for an open cell, woven, and/or braided composite truss for forming a wet wing structure.

2. Description of the Related Art

Foam and honeycomb are often used as core materials for sandwich core composite load bearing structures. When used for aircraft wing box construction, sandwich core composite structures present manufacturing and weight advantages over traditional rib 10 and spar 12 wing box structures (FIG. 8). The low density of these structures permits extensive use where weight factors are critical, such as with air vehicle applications.

Properly configured rib and spar structures provide internal support for airplane wings. When these designs are used for fuel storage, a structure known as "wet wing" is formed. Wet wings typically comprise building an open structure formed from an upper and lower "skin" sealed to a rib and spar internal support structure to contain liquid fuel for use by the aircraft.

The design of wet wing structures prevents large shifts in the fuel during acceleration, deceleration, or other movement of the aircraft. However, manufacturing a rib and spar wing structure is a labor intensive process that also complicates the design of a wing. A core-stiffened skin sandwich composite wing structure can be easier to design and more efficient to manufacture.

FIGS. 1 and 2 show diagrams of various traditional wing box designs. FIG. 1 shows a rib and spar wing box design. The load bearing upper and lower skins 13, 15 are supported by an internal substructure comprised of ribs 17 and spars 19. This design provides volume for a wet wing. However, its design and manufacture are complicated by the many individual substructure elements along with the associated tooling and labor for assembly. FIG. 2 shows a sandwich composite wing box design that uses a honeycomb or foam core internal structure 23 to support its load bearing skins 25, 27. This design provides a manufacturing advantage over rib and spar wing box designs. However, it does not provide volume for fuel storage.

Unfortunately, neither foam nor honeycomb material are appropriate as a core material if the structure is intended to be used for fuel storage. Even open cell foam or perforated honeycomb is insufficient due to extremely high surface areas that trap or retain fuel rather than making it available to the aircraft. Honeycomb material is further handicapped because its mechanical properties are anisotropic. Thus, an improved wing box design that preferably incorporates an isotropic core material suitable for use in a wet wing design would be desirable.

SUMMARY OF THE INVENTION

One embodiment of a system, method, and apparatus of the present invention comprises an open cell, three-dimensionally woven composite truss-like structure. It is formed on a loom using tow that is either pre-impregnated with resin and woven in a wet condition, or woven dry and then impregnated with resin in a follow-up step, or woven as a commingled fiber/resin fiber yarn. After weaving the tow into the desired three-dimensional, interlocking geometry, the resin is cured or consolidated while the material is still in the loom. This preserves the geometry of the interwoven structure. By adjusting the size of the carbon fiber tow and/or the cell size of the weave pattern, the woven core material can be tailored to meet a variety of structural needs. Once removed from the loom, the material can be machined to the desired shape. The machining process may require a sacrificial support material to stabilize the individual cured fiber strands during machining.

The present invention has many advantages, including the open cell nature of the core which allows for fuel storage in a wet wing structure. In addition, the truss type design of the core provides superior stiffness and strength to current core materials. Also, a manufacturing advantage is presented by reducing the number of fabrication steps in wing box construction over traditional rib and spar designs.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 3 is an isometric view of one embodiment of a wing box structural support design constructed in accordance with the present invention;

FIG. 4 is an enlarged isometric view of the design of FIG. 3 and is constructed in accordance with the present invention;

DETAILED DESCRIPTION OF THE INVENTION

Figure 1:
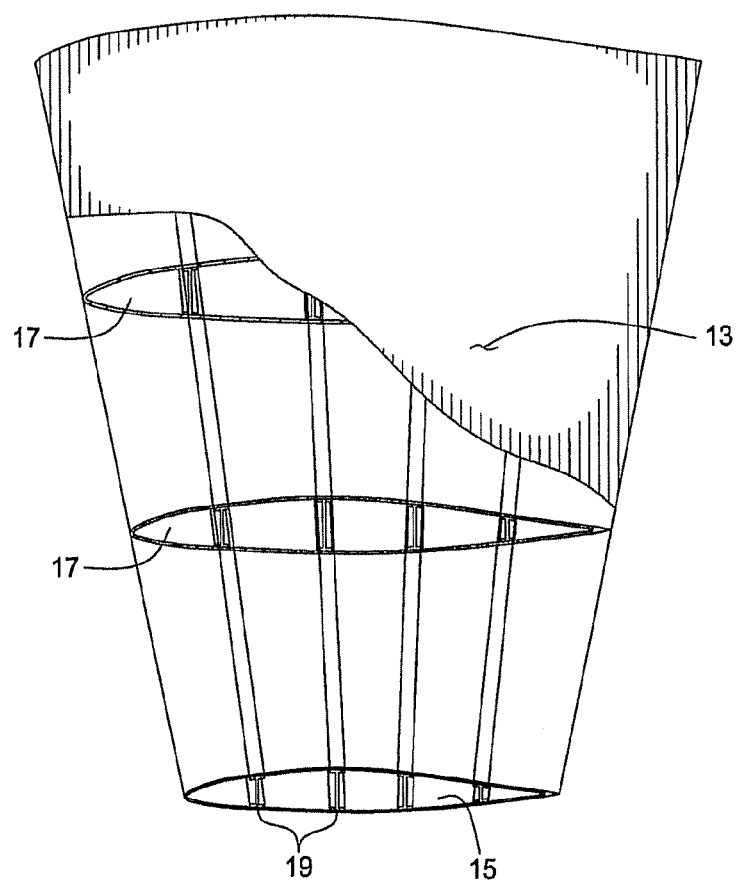
FIGS. 1 and 2 are isometric views of conventional wing box designs.
Figure 2:
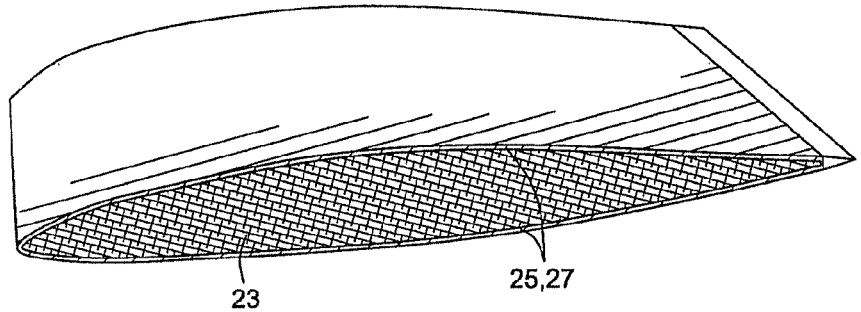
Figure 5:
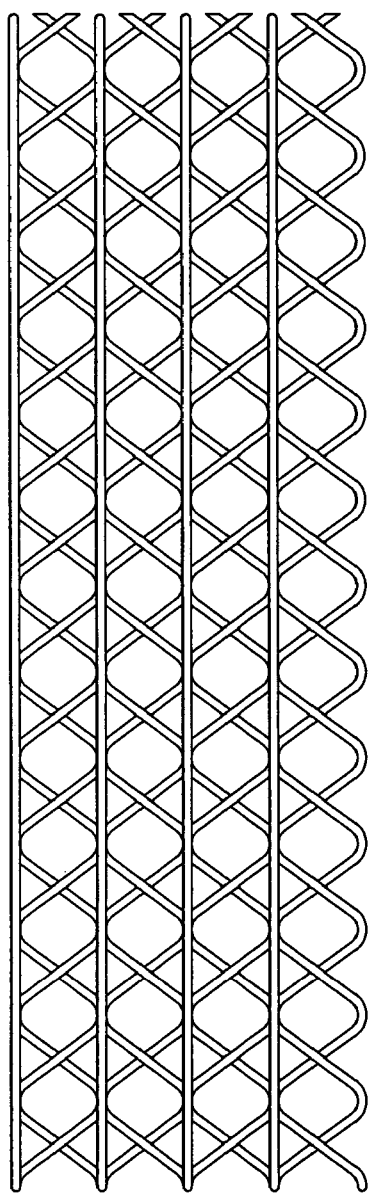
FIG. 5 is a front view of the design of FIG. 3 and is constructed in accordance with the present invention.
Figure 6:
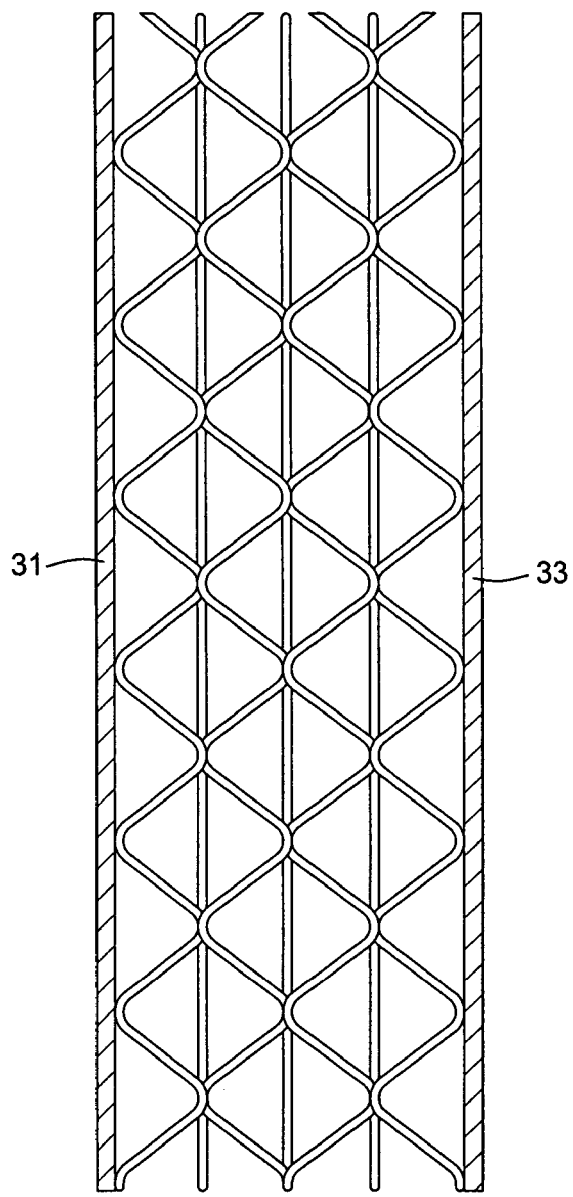
FIG. 6 is a side view of the design of FIG. 3 and is constructed in accordance with the present invention.
Figure 7:
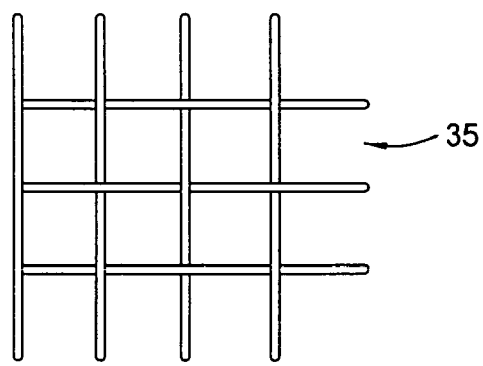
FIG. 7 is a top view of the design of FIG. 3 and is constructed in accordance with the present invention.
Figure 8:
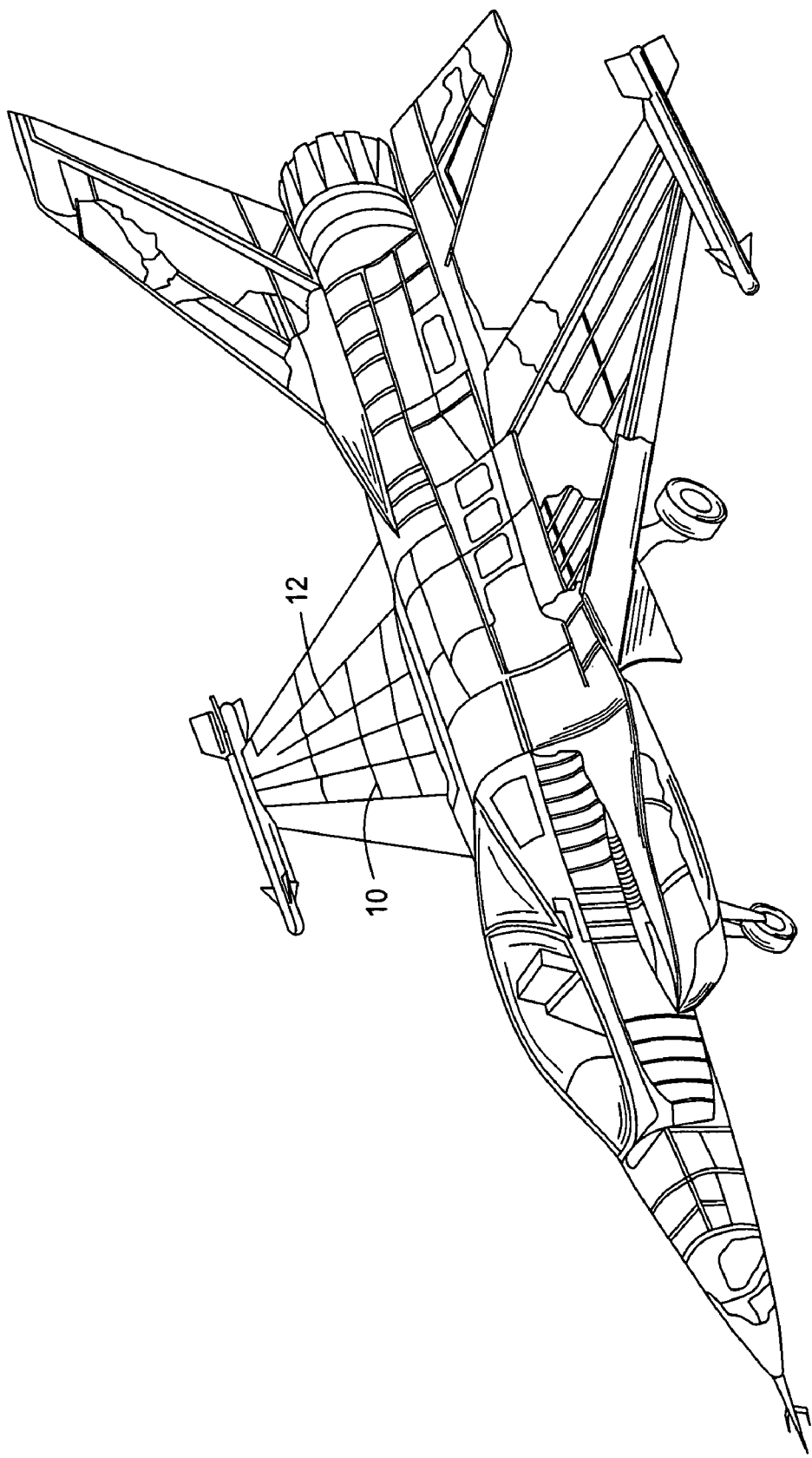
FIG. 8 is a partially sectioned, isometric view of an aircraft showing conventional ribs and spars.

Referring to FIGS. 3-7, one embodiment of a system, method, apparatus, and application for the present invention is shown. The present invention is well suited for forming a wet wing for an aircraft. In one embodiment, the wing comprises an upper skin 31 (FIG. 6), a lower skin 33, and a structure 35 extending between the upper and lower skins 31, 33. The upper skin 31, lower skin 33, and structure 35 are sealed together to form a wet wing configuration for containing aircraft fuel. The structure 35 is an open cell, woven composite truss having a three-dimensional, interlocking geometry formed from fiber tow impregnated with a cured resin.

The fiber tow may be formed from carbon, glass, ceramic, metal, polymer, synthetic, natural, acrylic, polyester, polyethylene, aramid, nylon, polyacrylonitrile, pitch, carbon, and graphite. The fiber tow may be sized in a range of 1,000 to 48,000 monofilaments.

The structure 35 may be characterized by a number of different parameters, including cell size, which is defined as the distance between "nodes" the truss structure. The structure also may be characterized by density. A dense core with large cell size has very large diameter tows woven together. Likewise, a lower density core with very small cell size has very small diameter tows woven together. These parameters and tow size may be used to design selected load bearing capability.

In addition, the structure 35 is also defined by its "openness." composite truss design of core reinforcement structure 35 provides volumetric openness of up to 99.95% open volume for fuel storage. Openness and surface area of structure 35 are two factors that determine suitability for fuel carriage. This low surface area of the present design is far superior to open cell foam which has extremely high surface area. However, the structure 35 is still capable of exhibiting isotropic bulk properties, like metal or foam. The consistent transfer of load across the surface of the wing skin supported by structure 35 also allows for a thinner skin design, as buckling loads are minimized compared to rib-stiffened skins with rib/spar design.

The present invention also comprises a method of forming a structure. In one embodiment, the method comprises weaving fiber tow with a loom into an open cell, woven composite truss-like structure in a three-dimensional, interlocking geometry; impregnating the fiber tow with resin; curing/consolidating the resin while the fiber tow are still located in the loom to preserve the three-dimensional, interlocking geometry and form a cured structure; and then removing the cured structure from the loom. The method may further comprise weaving resin yarn with the fiber tow as a commingled fiber tow/resin yarn combination.

The method may comprise performing the impregnating step before the weaving step, such that the fiber tow are pre-impregnated with the resin and woven in a wet condition. In addition, the method may further comprise adjusting a diameter of woven supports by controlling a size or filament count of the fiber tow; and/or adjusting a cell size of a weave pattern by controlling a geometry of the weave; and/or adjusting a load transfer and carrying mechanism by controlling a weave pattern and a cell size of the weave pattern. The method may still further comprise machining the cured structure to a final shape; and/or utilizing a sacrificial support material (e.g., foam) to stabilize the cured structure during machining; and/or chemically dissolving the foam after machining or thermally removing the foam through melting or burning the foam.

While the invention has been shown or described in only some of its forms, it should be apparent to those skilled in the art that it is not so limited, but is susceptible to various changes without departing from the scope of the invention.

What is claimed is:

1. A method of storing fuel in an aircraft wing, the method comprising:
   (a) weaving fiber tows with a loom into an open cell, woven composite truss-like structure in a three-dimensional, interlocking geometry;
   (b) impregnating the fiber tows with resin;
   (c) curing the resin while the fiber tows are still located in the loom to preserve the three-dimensional, interlocking geometry and form a cured structure; then
   (d) removing the cured structure from the loom;
   (e) machining the cured structure into a shape of an aircraft wing interior;
   (f) attaching upper and lower skins to the structure and sealing the upper and lower skins to form a wing; and
   (g) dispensing fuel into the interior of the wing.

2. A method according to claim 1, further comprising bundling resin yarn with the fiber tows being woven in step (a) as a commingled fiber tow/resin yarn combination.

3. A method according to claim 1, wherein the fiber tows are selected from the group consisting of carbon, glass, ceramic, metal, polymer, synthetic, natural, acrylic, polyester, polyethylene, aramid, nylon, polyacrylonitrile, pitch, carbon, and graphite.

4. A method according to claim 1, further comprising adjusting a diameter of the fiber tows by controlling a size or filament count of the fiber tow.

5. A method according to claim 1, further comprising adjusting a cell size of a weave pattern by controlling a geometry of the weave.

6. A method according to claim 1, further comprising adjusting a load transfer and carrying mechanism by controlling a weave pattern and a cell size of the weave pattern.

7. A method according to claim 1, wherein step (c) further comprises introducing a sacrificial support material into the cells of the cured structure to stabilize the cured structure during machining.

8. A method according to claim 7, wherein the sacrificial support material comprises a foam.

9. A method according to claim 8, further comprising chemically dissolving the foam after machining or thermally removing the foam through melting or burning the foam.

10. A method of storing fuel in an aircraft wing, the method comprising:
    (a) weaving fiber tows with a loom into an open cell, woven composite truss-like structure in a three-dimensional, interlocking geometry;
    (b) impregnating the fiber tows with resin;
    (c) curing the resin while the fiber tows arc still located in the loom to preserve the three-dimensional, interlocking geometry and form a cured structure;
    (d) removing the cured structure from the loom;
    (e) introducing a sacrificial support material as a foam into the cells of the cured structure; then
    (f) machining the cured structure to a final shape in a configuration of an aircraft wing interior; then
    (g) chemically dissolving the foam after machining or thermally removing the foam through melting or burning the foam;
    (h) attaching upper and lower skins to the cured structure and sealing the skins to form a wing; then
    (i) dispensing fuel into the wing.

11. A method according to claim 10, wherein step (b) occurs before step (a) such that the fiber tows are pre-impregnated with the resin and woven in a wet condition.

12. A method according to claim 10, wherein step (a) occurs after step (b) and further comprising bundling resin yarn with the fiber tows being woven in step (a) as a commingled fiber tow/resin yarn combination.

13. A method according to claim 10, wherein the fiber tows are selected from the group consisting of carbon, glass, ceramic, metal, polymer, synthetic, natural, acrylic, polyester, polyethylene, aramid, nylon, polyacrylonitrile, pitch, carbon, and graphite.

14. A method according to claim 10, further comprising adjusting a diameter of the fiber tows by controlling a size or filament count of the fiber tows.

15. A method according to claim 10, further comprising adjusting a cell size of a weave pattern by controlling a geometry of the weave.

16. A method according to claim 10, further comprising adjusting a load transfer and carrying mechanism by controlling a weave pattern and a cell size of the weave pattern.

17. A method of storing fuel in an aircraft wing, the method comprising:
  (a) weaving fiber tows with a loom into an open cell, woven composite truss-like structure in a three-dimensional, interlocking geometry with resin yarn that is bundled with the fiber tows as a commingled fiber tow/resin yarn combination;
  (b) impregnating the fiber tows with resin before step (a) such that the fiber tows are pre-impregnated with the resin and weaving the fiber tow in a wet condition;
  (c) curing the resin while the fiber tows are still located in the loom to preserve the three-dimensional, interlocking geometry and form a cured structure;
  (d) removing the cured structure from the loom;
  (e) machining the cured structure to a final shape in a configuration of an aircraft wing interior;
  (f) introducing a sacrificial support material comprising a foam into the cells to stabilize the cured structure during machining; and then
  (g) chemically dissolving the foam after machining or thermally removing the foam through melting or burning the foam;
  (h) attaching upper and lower skins to the structure and sealing the upper and lower skins to form an aircraft wing capable of holding fuel; and
  (i) dispensing fuel into the interior of the wing.

18. A method according to claim 17, wherein the fiber tows are selected from the group consisting of carbon, glass, ceramic, metal, polymer, synthetic, natural, acrylic, polyester, polyethylene, aramid, nylon, polyacrylonitrile, pitch, carbon, and graphite.

19. A method according to claim 17, further comprising adjusting a diameter of the fiber tows by controlling a size or filament count of the fiber tow.

20. A method according to claim 17, further comprising adjusting a cell size of a weave pattern by controlling a geometry of the weave.

21. A method according to claim 17, further comprising adjusting a load transfer and carrying mechanism by controlling a weave pattern and a cell size of the weave pattern.

* * * * *